July 18, 1967

J. B. GUIN 3,331,201

EXHAUST PURIFYING SYSTEM

Filed Sept. 1, 1965

INVENTOR.
Joel B. Guin

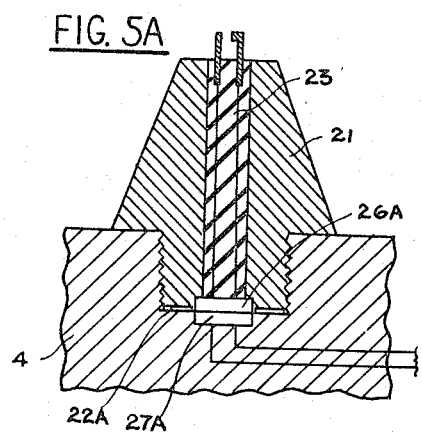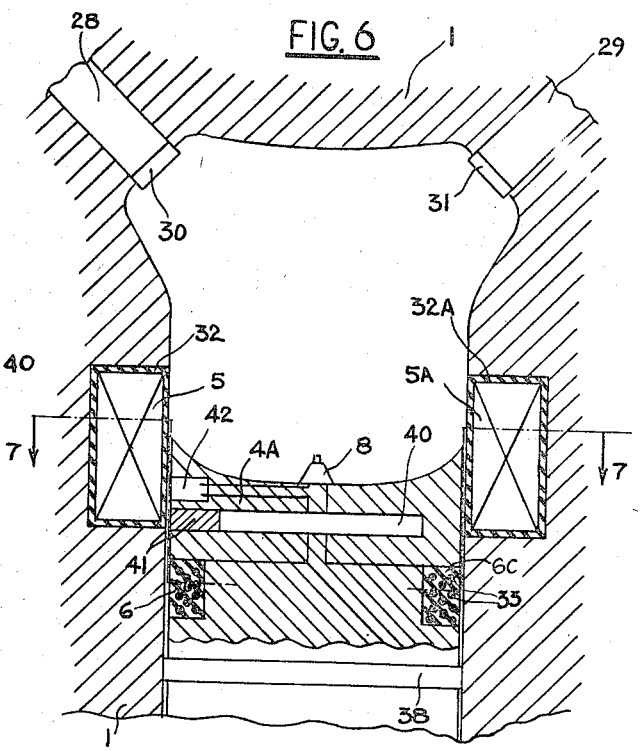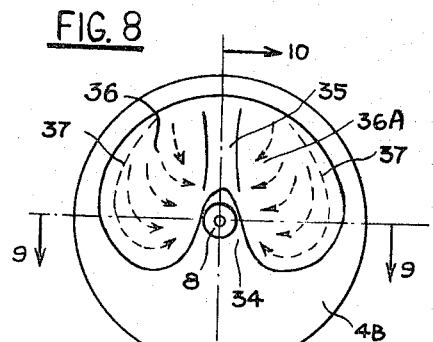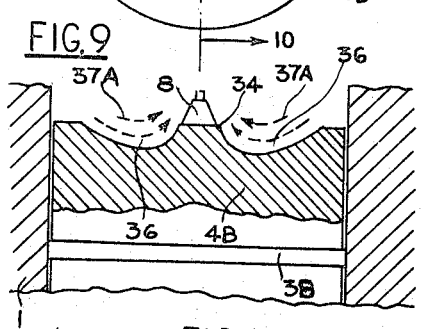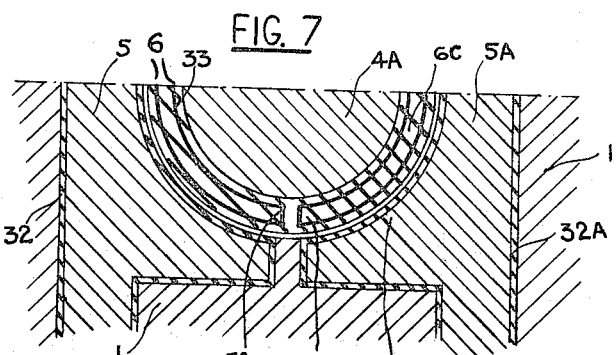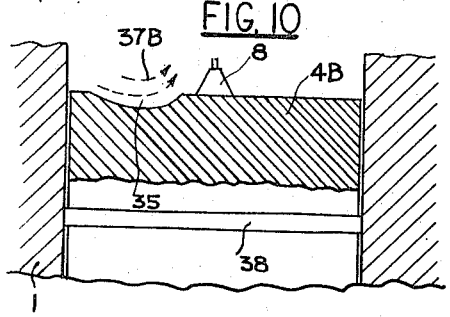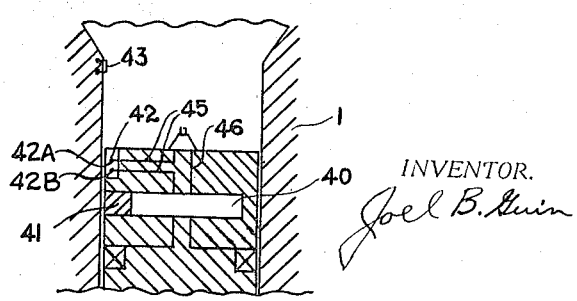

July 18, 1967   J. B. GUIN   3,331,201
EXHAUST PURIFYING SYSTEM
Filed Sept. 1, 1965   4 Sheets-Sheet 3
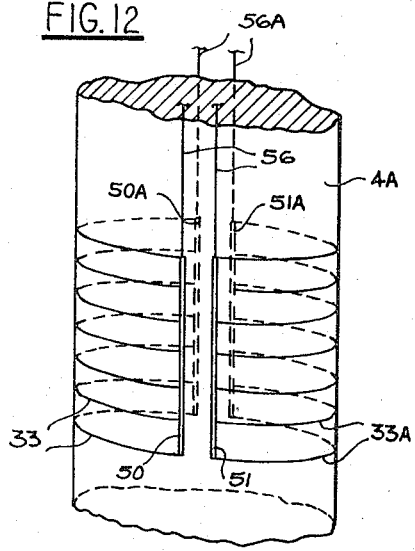
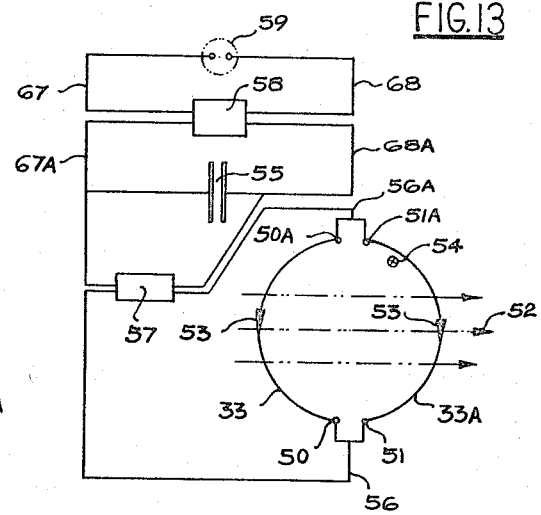
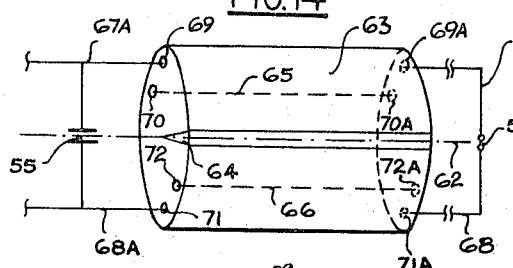
INVENTOR
Joel B. Guin

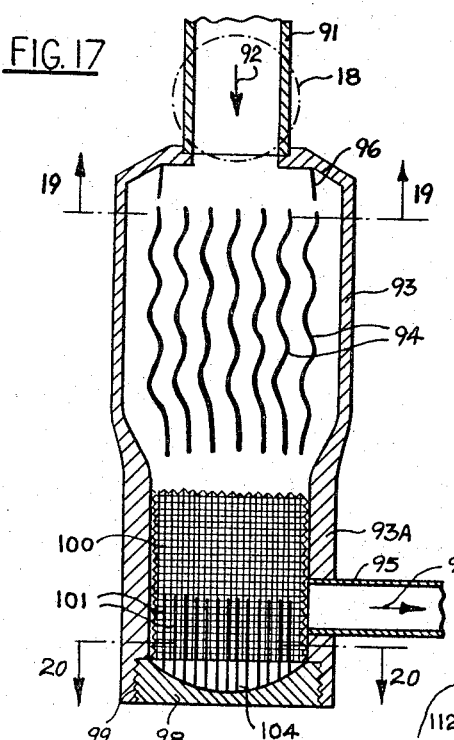
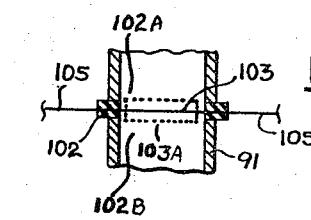
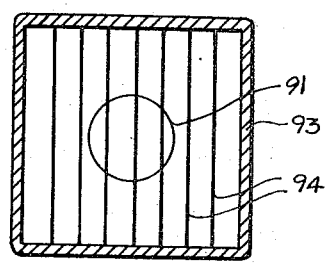
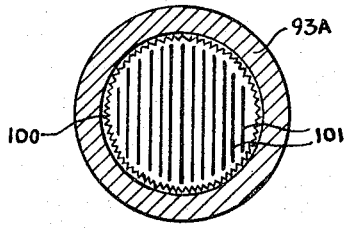
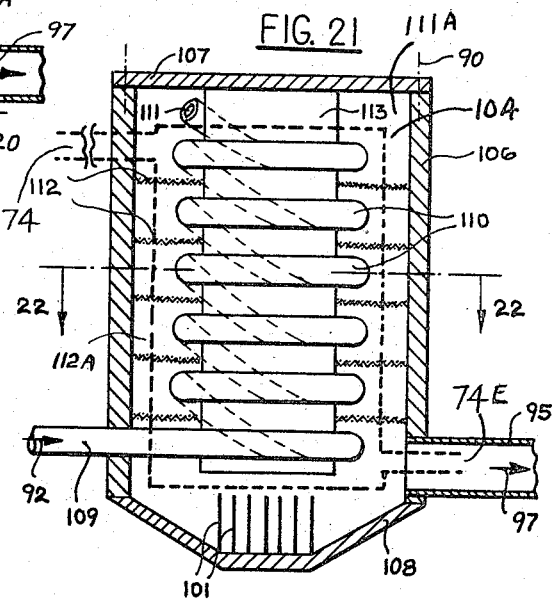
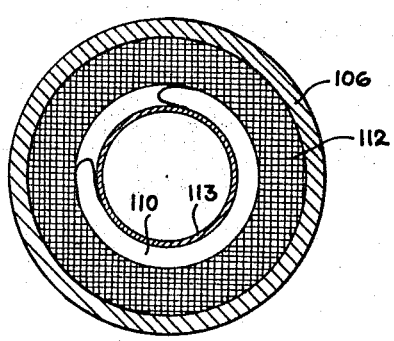
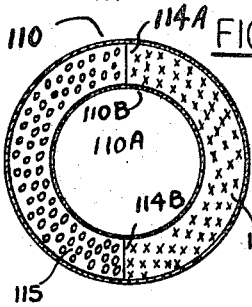

United States Patent Office 3,331,201
Patented July 18, 1967

3,331,201
EXHAUST PURIFYING SYSTEM
Joel B. Guin, 148 E. 48th St.,
New York, N.Y. 10017
Filed Sept. 1, 1965, Ser. No. 484,198
7 Claims. (Cl. 60—30)

This invention relates to a clean exhaust internal combustion engine designed to eliminate most of the harmful products from exhaust gases by a number of devices and processes, the more important of which include:

A spark device that provides a much hotter spark than is commonly used today, the preferred device being a self-induction spark plug that provides not only a primary spark of any desired energy to ignite the fuel-air mixture, but also an equally hot secondary spark during the latter part of the exhaust stroke of a 4-stroke engine to help burn any unburned hydrocarbons and carbon monoxide and to heat up the exhaust gases as they enter the exhaust manifold;

Optional electrical devices by which some of the energy can be deducted from the primary spark and added to the secondary spark, for heating purposes in a burner-muffler;

Indentations and ridges in the top of each piston to produce a vortex or swirl in the fuel-air mixture to bring all fuel into the burning area, to sweep unburned fuel off the cylinder walls thereby reducing "wall-quenching" a phenomenon known to be mainly responsible for the unburned hydrocarbons in exhaust emissions, and thereby to speed up and make more thorough the flame propagation (photographs through quartz windows of combustion chambers indicate that flames do not penetrate the fuel-air mixture within 0.002" to 0.016" of the cylinder wall; tests show that a large share of this unburned fuel exits with the exhaust; some experts believe that the unburned hydrocarbons at lower intake manifold depressions—during idling, cruise and acceleration—are mainly caused by "wall-quenching," and that the proportion of quench-zone hydrocarbons is less than the proportion of total gases exhausted; a normal accompaniment of operation at high intake manifold depressions is a large amount of residual gas giving a high dilution in a 4-stroke engine);

An auxiliary fresh-air intake leading to a compressor thence to a compressor-container to provide a blast of air through a valve opening during the latter part of the exhaust stroke in a 4-cycle engine or in a diesel engine, to thoroughly scavenge all exhaust products, thus eliminating the above-named residual gas (exhaust) that contaminates the succeeding combustion cycle and produces some carbon monoxide due to the lack of oxygen, and to furnish more oxygen to assist the above-named burning promoted by the secondary spark, the burning taking place both in the exhaust manifold and in the burner-muffler; and A burner placed at the end of the exhaust manifolds that— has one or more burning chambers in which unburned components can burn, the heat being enough to ignite them,
has a container for heat-storing material (preferably ceramic or rock) and catalysts to assist burning and breaking up of the more noxious exhaust emissions, the container in turn being heated by a wire supplying supplementary energy if necessary or desirable,
has an optional coil containing adsorbents for taking out any remaining offensive particles beyond the health limits established by legislative and regulatory bodies, the adsorbents being placed preferably within an annular cylindrical space between two coil pipes encircling a cylinder in the burner-muffler,
Baffle plates that set up vortices and turbulence within the exhaust stream to assist fall-out of heavy particles,
Sieves and/or filters for further cleaning the exhaust gases,
And a depositary for holding fall-out particles temporarily (since this burner performs all the functions of a muffler as well as those of burning and cleaning up the exhaust emissions, it will hereafter be referred to as a burner-muffler).

The spark device derives its energy from a coil which moves through a magnetic field. The two poles of a soft iron magnet surround the engine cylinder. Excitation energy for the U-shaped magnet comes from a battery or other power supply and a field coil is wound around the magnet, to produce a magnetic field across the inner diameter thereof. A coil imbedded in non-conducting material and separated into two semi-circular parts, is placed within the outer circle but around periphery of the piston: as the piston moves up and down, electric current is produced in the coil and is carried through wires from each end of the two semi-circular parts into a capacitor connected to the two electrodes of the spark device in the cylinder head.

The capacitor may be discharged in several ways, but the preferred method is by an inertia switch contained within the piston, designed to close the circuit near the top of the up stroke, i.e. near the end of the compression and exhaust strokes in a 4-stroke engine, and near the end of the compression stroke in a 2-stroke engine.

There are several solutions to the problem of varying current produced by the induction spark device at different speeds, but the preferred solution is to have enough current produced for a strong spark at any speed, even the slowest. This will of course mean that more current is produced than needed at the medium speeds but this will simply produce a hotter spark and therefore cause a more complete combustion of the fuel-air mixture: also, the secondary spark will also be hotter, which means that carbon monoxide and unburned fuel will be burned more effectively in the exhaust manifold and in the burner-manifold—both action serving to accomplish the purpose of cleaner exhaust emissions. Due partly to the insufficient time to "load" the capacitor at high speeds, most usable current is produced at medium speeds, resulting in greatest fuel economy and engine efficiency at those speeds and thus encouraging most drivers to drive at those speeds: this is an indirect assist for reduced air pollution.

The blasting of fresh air from a compressor-container directly into the combustion chamber is different from any internal combustion engine known to this inventor, and may be considered revolutionary by some engineers. Since no really revolutionary change has been made in such engines for several decades, and since very few entrepreneurs can be expected to take chances on one, this device is termed "optional." Its help in increasing engine efficiency, its ability to cool the engine far more effectively than water-jackets and thereby make air-cooling truly effective, and its assistance in cleaning up the exhaust gases, should within very few years eliminate the word "optional." Legislative and regulatory bodies may be the ones who determine how long that will be. This compressed air blast near the spark device, along with the resulting vortex effect and the hotter spark, will help keep the spark electrodes clean, stop fouling and thereby prevent misfiring, another source of noxious emissions.

Most anti-pollution devices proposed up to the present are based on some sort of burner or catalyst for the exhaust, and most of them are effective to a degree, but they are too costly for the results achieved. The present approach is that of re-engineering the entire fuel-combustion-ignition-exhaust-muffler system instead of adding a gadget to an already over-complicated mass of gadgets that make up the present system. Since the burner can perform all of the functions of the muffler better than any muffler the two are combined into one. The savings on the muffler allow construction of a far more thorough burner, incorporating sieves, baffle plates to form swirls and/or vortices, fall out containers, catalysts and adsorbents, and heating elements—in its various modifications: all of them could not be included in one device. Even without adsorbents, a device incorporating three or four will reduce exhaust emissions to well below the current limit ordered by the California Motor Vehicle Pollution Control Board, namely: 275 p.p.m. for hydrocarbons, 1.5% by volume for carbon monoxide levels and 0.15% for crank-case emissions. The present complex, suggested for achieving a minimum of noxious emissions, aims to go even below the already-proposed reductions in the above limits, namely: 180 p.p.m. for hydrocarbons, 1.0% for carbon monoxide levels and 0.1% for crank-case emission, because the senseless pollution of city air from increasing numbers of cars and trucks is becoming so intolerable that the public will demand more rigid and therefore more salutary anti-pollution standards.

Adsorbents that might be used include: silica gel, activated alumina or bauxite, fuller's earth and activated clays, all but the last being easily regenerated for repeated use. Due to the hot exhaust, most known adsorbents will work very inefficiently. Therefore provision is made for a cooling chamber to surround the adsorbent-containing coil and cool it with air from the same compressor-container that supplies air to scavenge the cylinders after each exhaust stroke. To further increase adsorbent efficiency, it is suggested that, for the sake of human welfare, intense research be done to develop adsorbents that will work effectively even at high temperatures.

The above objects and advantages will become clear when the inclosed description is read in conjunction with the accompanying drawings in which FIG. 1 is a vertical section through the upper cylinder before the piston enters the magnetic field of the cylinder coil;

FIG. 5A shows the spark device in final position;

FIG. 6 is a vertical section through the top part of the cylinder showing intake and exhaust valves and channels;

FIG. 7 is a horizontal section along line 7—7 in FIG 6;

FIG. 8 shows a modification of the piston top, with indentations particularly designed for diesel-type combustion;

FIG. 9 shows a vertical section along line 9—9 in FIG. 8;

FIG. 10 is a vertical section along line 10—10 in FIG. 8;

FIG. 11 is a vertical section of one version of a capacitor unloading wiring arrangement, for making the spark discharge;

FIG. 12 shows schematically the details of the split coil used to generate induced current by piston oscillations in the pistons shown in FIGS. 1, 1A, 1B, 3, 7 and 11;

FIG. 13 shows a wiring diagram showing location of coil, condenser, switches and spark device in relation to each other;

FIG. 14 shows a modification of the capacitor unloading device consisting of a rotating drum switch, in neutral position;

FIG. 14A shows the same drum switch in unloading position;

FIG. 15 is a top view of a motor block with exhaust manifold and an auxiliary intake manifold connected to cylinders;

FIG. 16 is a vertical section through a cylinder top showing valves, auxiliary air intake valve, and "swirl" indentations on top of the piston;

FIG. 17 is a vertical section showing details of the burner-muffler 81 in FIG. 15;

FIG. 18 shows a modification of section 18 in FIG. 17;

FIG. 19 is a horizontal section along line 19—19, FIG. 17;

FIG. 20 is a horizontal section along line 20—20 in FIG. 17 showing the cylindrical sieve in the lower part of the burner-muffler;

FIG. 21 is a vertical section through a modification of the burner-muffler in which a cleaning coil is used;

FIG. 22 is a horizontal section along line 22—22 in FIG. 21, showing one of the horizontal sieves around cleaning coil;

FIG. 23 is an enlarged vertical section through one of the cleaning pipes showing two different cleaning chemicals, one for heavier exhaust particles slung out by centrifugal forces, and the other for the lighter particles and components that exit on the opposite (inner) side of the cleaning coil.

Figure 1:
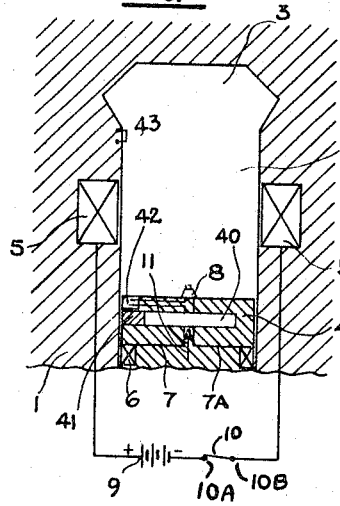
FIG. 1A shows the piston after it has passed through the magnetic field between the magnets around the cylinder walls.
FIG. 1B shows the piston in such position that the coil is directly between the magnets, but showing how current can be cut off simply by opening the switch to cut off field excitation.
Figure 1A:
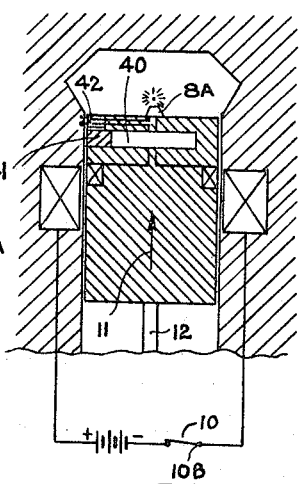
Figure 1B:
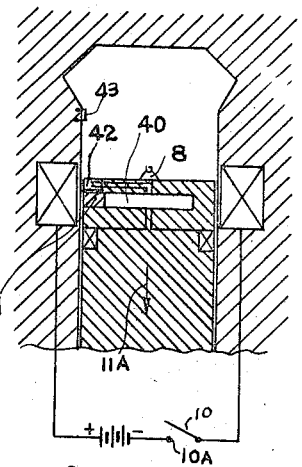

Turning now to the drawings, FIGS. 1 through 1B show schematically vertical sections through the upper cylinder part, the position of the piston being down in FIG. 1, up in FIG. 1A, and on the way back down in FIG. 1B with the coil on the piston directly between the encircling magnets in the cylinder walls. In FIGS. 1 and 1A the current from battery 9 is on because switch 10 is closed at contact 10A; FIG. 1B shows the excitation current cut off by the opening of switch 10, a use not needed in most of the applications of this invention, but of potential use in different applications. The direction of the piston movement is shown by "up" arrows 11 and "down" arrows 11A. Piston 4 moves within cylinder 2 having combustion chamber 3. Cylinder 2 has walls 1 into which are inserted magnets with left and right poles 5 and 5A respectively. Inserted into piston 4 having piston rod 12 is a heat-insulated coil 6 connected by left and right circuit lines 7 and 7A respectively with capacitor 40 held in place by plug 41. From the capacitor the current is led to circuit contacts 42 which close the circuit when the contact ends both touch metal bridge 43 near the top limit of the piston cycle, the bridge being placed so as to unload the capacitor at the exact time in the cycle, as in FIG. 1A where spark device 8A is producing a spark. This is only one of several ways of "unloading" the capacitor, another being shown in FIG. 14, a rotating drum switch. The details of the wiring for the capacitor unloading process are shown in greater detail in FIG. 11.

Figure 2:
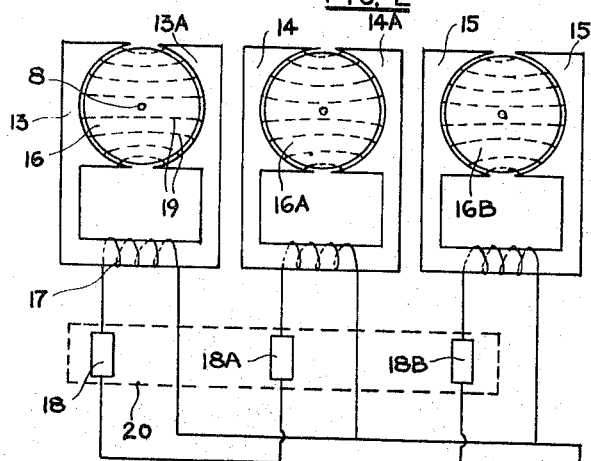
FIG. 2 shows one arrangement of cylinders in a top view of magnets surrounding three cylinders sideways.

FIG. 2 shows a triple arrangement of cylinders in a top view with magnets surrounding pistons 16, 16A and 16B sideways, with the north and south poles being respectively on the left and right sides of the pistons as drawn, the poles being numbered from left to right 13 and 13A, 14 and 14A and 15 and 15A respectively. The produced magnetic field lines are indicated by dotted lines 19. The field excitation coils 17 are connected with battery 9. Although the present application of this invention does not use them, provision for distributors may be made as shown in 18, 18A and 18B which in turn can be combined in one distributor unit 20, shown in dashed lines.

Figure 3:
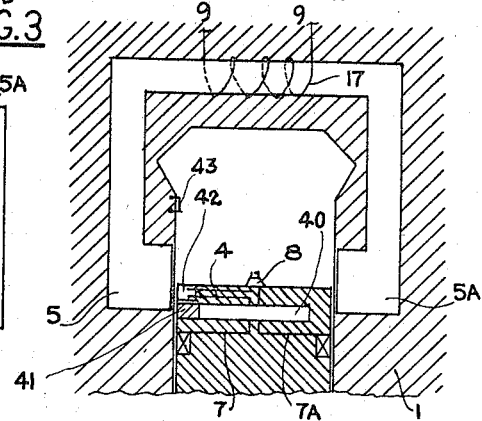
FIG. 3 shows a modified magnet arrangement in vertical section, with magnet closing over the top of the cylinder.
Figure 4:
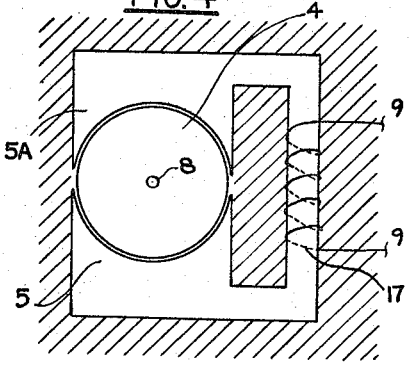
FIG. 4 shows a modified magnet arrangement with the magnet closing at the side of one cylinder.

FIG. 3 shows one modification of the magnet arrangement with the magnet closing over the cylinder, whereas FIG. 4 shows another modification, similar to the triple arrangement in FIG. 2, with the magnet closing sideways around the cylinder. Although not essential, the magnets are shown completely surrounded by cylinder wall 1. The other parts are the same as in FIGS. 1 to 1B.

Figure 5:
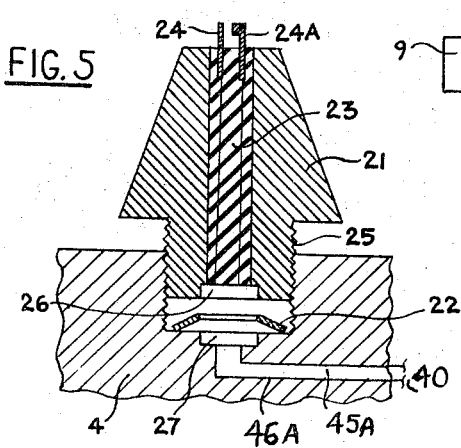
FIG. 5 shows one version of the spark device in a vertical section along the axis before it is screwed into its final position.

FIG. 5 shows a vertical section through a spark device before it is screwed into position, and FIG. 5A shows it in final position for use. Two electrodes 24 and 24A held by inner insulation column 23, in turn surrounded and supported by a hard, durable structure 21, are connected to a connection means shown disconnected in 26 and connected in 26A, which has a counterpart in another connection means from the capacitor 40, shown disconnected at 27 and connected at 27A. The spark device is screwed against a flat spring shown in relaxed position at 22 and in pressure position at 22A.

FIG. 6 shows the top section of the piston cylinder with intake channel 28 having intake valve 30 and exhaust channel 29 having exhaust valve 31. Left and right poles 5 and 5A in the cylinder walls represent the north and south poles respectively of a magnet surrounded by insulating layers 32 and 32A respectively. Piston 4A with concave piston top and piston ring 38 has inserted within its outer walls a coil 6 with wires 33 all of which are imbedded in a non-conducting heat-insulating material 6C.

FIG. 7 is a horizontal section along the broken line 7—7 in FIG. 6 showing insulating layers 32 and 32A around left and right poles 5 and 5A respectively. Wires 33 of insulated coil 6, imbedded in material 6A are shown surrounding piston 4A (only half of which is shown). The coil is shown in vertical section in FIG. 12.

FIG. 8 is a top view of a piston 4B designed especially for diesel engines. Middle section 34 of the piston top has indentations 36 on the left and 36A on the right, with a saddle 35 between, the combined effect being to give a marked "swirl" to the fuel-air mixture when it is injected into the cylinder, the arrows 37 indicating the streamlines of the mixtures, leading toward the spark device and thus promoting flame propagation.

FIG. 9 is a vertical section along line 9—9 in FIG. 8 showing a side view of the stream-line effect, arrows 37A showing the direction of flow through indentation 36 up toward device 8.

FIG. 10 is a vertical section along line 10—10 in FIG. 8 showing a side view of the lines indicated by arrows 37B as they stream along saddle 35 toward the spark device. FIGS. 8–10 are only one of the many ways to promote flame propagation which helps improve combustion of all the hydro-carbons in fuel. Another pattern is shown at 83 in FIG. 16. In addition to bringing fuel-air and flame together more effectively and continuously, the swirl produced by such patterns, some tending toward a vortex helps sweep the unburned fuel-air off the walls and thus decrease the phenomenon known as "wall-quenching" which has been found to be one of the greatest causes of unburned products in the exhaust. This vortex-swirl effect, along with hotter spark, air blast, thorough scavenging and fewer noxious gases that can be forced around the piston rings, will thus reduce harmful crankcase emissions, in both diesel and internal combustion engines.

FIG. 11 shows the circuit for unloading the capacitor 40 consisting of left circuit 45 and right circuit 46. The former continues to contacts 42A and 42B which can be connected by means of metal bridge 43 on the wall of cylinder 1 when the piston reaches the "up" position. Plug 41 holds capacitor 40 in position, and can also be easily removed for maintaining or replacing 40.

FIG. 12 shows schematically the divided coil around the piston consisting of left and right coil wires 33 and 33A respectively. Two vertical connecting wires 50 and 51 in front and 50A and 51A in back are joined to the left and right coil wires 33 and 33A respectively. The front vertical wires lead to circuit line 56 and the vertical wires in back lead to circuit line 56A.

FIG. 13 is a schematic diagram of the wiring within the piston (4A in FIGS. 6 and 7). When the piston containing the coil (6 in FIGS. 6 and 7) consisting of left and right coil wires 33 and 33A respectively moves vertically downward, i.e. perpendicular to the plane of the drawing, as indicated by the arrow in circle 54, within magnetic field 52, shown by dash-dot lines, a current is induced in the direction of arrows 53. This current loads capacitor (condenser) 55. Since the current reverses direction between the down and up stroke, and vice versa, a switch 57 is provided to reverse the current of one of the strokes, so that all current will be in the same direction. The condenser is connected by lines 67A and 68A with unloading switch 58 which is in turn connected with spark device 59 by lines 67 and 68.

FIG. 14 shows schematically the rotating drum switch used to unload condenser 55 in FIG. 13. The switch is shown here in the neutral position. It consists of drum 63 rotating around imaginary axis 62 and having two internal wires 65 and 66 ending at the left in contact plates 70 and 72 and at the right in contact plate 70A and 72A respectively. Wires 67A and 68A end in contact plates 69 and 71, and wires 67 and 68 end in contact plates 69A and 71A respectively. Inserted into drum 63 is heavy section 64 which will force drum to turn around axis 62 when accelerated up or down.

FIG. 14A shows drum 63 accelerated upwards as indicated by arrow 61, forcing heavy section 64A to move downwards, due to inertia. All corresponding contact plates are thus connected to the appropriate wires to close the contacts necessary to unload condenser 55, i.e. plate 70 to wire 67A, 72 to 68A, 70A to 67 and 72A to wire 68.

FIG. 15 is a top view of a motor block with regular-type exhaust manifolds 79 and 79A connected by exhaust channels 80 and 80A respectively to cylinders 78 and 78A respectively; and auxiliary intake manifold 75 through which an auxiliary blast of air enters in the direction of arrow 76, the purpose of this air being to completely clean out all exhaust products, sweep the cylinder walls and furnish fresh oxygen for the more complete burning of said exhaust products in the muffler-burner 81 through which both exhaust manifolds empty, especially the carbon monoxide. This cleaner cylinder preparatory to the next combustion cycle is designed to give a cleaner, more complete combustion of the fuel-air mixture, undiluted by residual exhaust products from the previous combustion, thereby getting more power out of the gasoline and producing less carbon monoxide due to having said residual exhaust products already in the mixture. A secondary benefit of this blast of fresh air is that it helps enormously to cool the cylinder and thereby makes it fairly simple to eliminate all water-cooling equipment, and replace it with much less expensive air-cooling vanes. The money saved by this change will pay most of the cost of the changes suggested by this invention. The greater efficiency and economy of the air-cooled engine are of course known to all. This air-cooling change, however, is not essential to the cleaner exhaust. The air enters intake manifold 75 from compressor-container 74, preferably powered by crankshaft as in present devices. The fresh air enters cylinders 78 and 78A through channels 77 and 77A respectively on left and right. The resulting scavenged exhaust products, with the carbon monoxide and unburned hydrocarbons now burning, assisted by the fresh oxygen and the secondary spark from the self-induction spark-plug described herein which may be constructed to give an unusually heavy spark (either by making the primary spark also much hotter than necessary for normal ignition through more coil wires and more powerful magnets, or by special transistors and wiring circuits that subtract some current from the primary spark and add it to the secondary spark near the end of the exhaust stroke) pass out through exhaust channels, along with the regular exhaust, through lines 80 and 80A leading to exhaust manifolds 79 and 79A respectively, which in turn lead into burner-muffler 81 for further burning, filtering, centrifuging and other types of particle separation. All products of combustion, along with the remaining air from the fresh air blast, finally exit through exhaust pipe 82.

FIG. 16 is a vertical section through the top of cylinder 1 showing fuel-air intake 84, exhaust channel 85, auxiliary air inlet 86. The extra air sweeps out exhaust products somewhat along the lines of dotted line 87, but of necessity enough turbulence is set up to help sweep through all the upper part of the cylinder, the extent of this being determined by the moment when the valve is opened to let in this blast of fresh air. Piston 4A, which has vortex-inducing indentation 83 on its top, is moving upward within cylinder 1 as shown by arrow 11B.

FIG. 17 is a vertical section through the first version of the burner-muffler that will be described in this application, although many variations are possible using the same ideas. In fact, it should be emphasized that all the ideas described herein do not necessarily have to be incorporated in any one engine. Each different device makes its contribution and the manufacturer will of course include those that do the most for the money spent on them. Still burning exhaust gas enters pipe 91 in the direction of arrow 92. It enters upper burner chamber 93 steaming through curved baffle plates 94. Guiding plates 96 help control the flow. Many of the particles will fall out due to the vortices inducted by the curves in the baffle plates. The exhaust then enters lower burning chamber 93A from which it will flow into exhaust pipe 95 in the direction of arrow 97. Screwed into the bottom of lower chamber 93A by threads 99 is bottom plate 98 having a cylindrical sieve 100 and fall-out plates 101 fastened to it, and having depositary 104 for temporary holding of ashes, fall-out particles, etc.

FIG. 18 is a modification of section 18 in FIG. 17. Wire 103, held on left and right by nonconducting fasteners 102, is connected on left and right to circuit lines 105 through which it receives electric energy to heat incoming gases, and to help keep heat-storing material 103A, preferably long-lasting ceramic or rock material, at a temperature high enough to ignite any remaining unburned carbon monoxide or hydrocarbons. This heat-storing material is held in place by grids above and below 102A and 102B respectively, along with catalytic agents for converting noxious exhaust emissions to less harmful components. For example a catalytic agent such as copper oxide will help break down nitrogen oxides into nitrogen and oxygen, reducing the nitrogen oxides to well within the limit of 200 p.p.m. as tentatively proposed by the California Department of Public Health. Other catalysts may be included for those limitations of exhaust emissions that will inevitably be enacted or ordered by various state bodies within the next few years. Grids 102A and 102B are supportably attached to the inner wall of pipe 91.

FIG. 19 is a horizontal section along line 19—19 in FIG. 17 showing inlet pipe 91, upper burner chamber 93 and curved plates or baffles 94. As a modification, the catalytic container grids sketched in FIG. 18 may be enlarged in area and attached to the walls of chamber 93 in order to give more room for the catalysts and heat storing material and to hinder less the flow of exhaust gases through the burner-muffler.

FIG. 20 is a horizontal section along line 20—20 in FIG. 17 showing lower burner chamber 93A, fall-out plates 101 which are fastened to bottom plate 98, and cylindrical sieve 100.

FIG. 21 is a vertical section through a modification of the burner-muffler in FIG. 17, consisting of burner chamber 106, top plate 107 fastened to chamber 106 by screws 90, and bottom plate 108 to which are fastened fall-out plates 101. Exhaust products from the engine cylinders enter the system through pipe 109 which continues into cleaning-exhaust coil 110, leaving through opening 111 into space 111A within chamber 106, from whence they pass through sieves 112 attached to the walls of chamber 106 and cylinder 113, finally to exit through exhaust pipe 95. Cleaning-exhaust coil 110 is supported by cylinder 113. The container for heat-storing material and for catalyst shown in FIG. 18, and the baffle plates 94 and sieves 100 in FIG. 17 may be included within cylinder 113, but are not drawn here. The function of coil 110 is described along with FIG. 23 below. In order to reduce the temperature of the adsorbents contained in the annular space in coil 110 provision is made for a cooling chamber 104, shown in dotted lines, which receives cool air from compressor-container 74 in FIG. 15. Simultaneously exhaust gases pass through porous walls of coil 110 into chamber 104 and pass, along with the cooling air through pipe 74B into exhaust pipe 95, in the direction of arrow 97.

FIG. 22 is a horizontal section along line 22—22 in FIG. 21 showing burner chamber 106, horizontal sieve 112, inner cylinder 113 and cleaning-exhaust coil 110.

FIG. 23 is a vertical section through coil 110. Exhaust gases that had entered pipe 109, FIG. 21, continues through space 110A in coil 110. The annular space between the outer pipe of coil 110 and inner pipe 110B is filled with adsorbents which are of two types, 115 for adsorbing heavy components of the gases that are flung outward by centrifugal force and the other, 114 for adsorbing lighter exhaust components left on the inner side of the coil. The part containing adsorbents 115 is placed on the outer side of the coil turns, the portion containing adsorbents 114 on the inner side next to coil 110. The exhaust gases pass through both adsorbents, thence through the porous walls of coil 110 into cooling chamber 104, to pass on through pipe 74E into exhaust pipe 95. Any remaining gases leave opening 111 into space 111A in FIG. 21. Among the adsorbents already developed that could be used are: silica gel, activated alumina or bauxite, fuller's earth and activated clays of various kinds. All but the last are easily regenerated and can be used repeatedly. Due to the very hot temperatures of the gases, the efficiency of these adsorbents will be rather low unless very large quantities of cooling air pass around coil 110 within cooling chamber 104. Another alternative is to develop adsorbents that will operate efficiently at high temperatures. Even at low efficiency, the adsorbents serve to briefly store gases which are forced out shortly by other gases, at an even rate, thus reducing surges of poison at critical points, such as stop-lights, garages, tunnels, etc. where most harm is done.

I claim:

1. An exhaust purifying system for reducing carbon monoxide, unburned hydrocarbons and other harmful gases, comprising:
    an internal combustion engine;
    within each cylinder of the engine, a means for producing a relatively hot ignition spark, said means also producing a hot secondary spark near the end of the exhaust stroke to help burn unburned fuel and further heat the exhaust;
    an arrangement of indentations and ridges in the top of each piston in said engine for producing a vortex-swirl effect in the burning fuel-air mixture so as to reduce wall-quenching by sweeping fuel off the walls into the burning fuel, and to promote flame propagation throughout the combustion chamber;

an air compressor and compressed air container located on and supported by the upper front of said engine and receiving power from the crankshaft of said engine, to provide air under pressure;

a compressed air intake into said cylinder, selectively located so that a blast of air from said compressed air container can mix with the products of the burned and burning fuel-air mixture;

an exhaust manifold leading from the exhaust port of the combustion chamber, with a heating element extending across the channel of said manifold near its intake end;

a grid container for catalytic materials for assisting in breaking up exhaust emissions that are harmful, the container being located around the heating element, and being supported by the surrounding walls;

a heat-storing material within said grid container that is kept hot enough to ignite unburned combustion products;

and a burner-muffler connected to said manifold and comprising a chamber in which burning is completed, a means for causing heavier particles in the exhaust to fall out and settle to the bottom of the burner-muffler, container means for temporary holding of fall-out particles, said container being easily removed for quick emptying, and container means for adsorbents in said burner-muffler that can briefly hold large amounts of noxious products of combustion, to prevent surges of large amounts of noxious gases.

2. The substance of claim 1, said compressed air intake being placed to direct the air blast close to said spark device and thereby help clean it, and at an angle with respect to the cylinder walls and the piston top to produce a vortex-swirl effect with the unburned products being forced near the spark device to be ignited by said secondary spark, most of the remaining fuel on the walls being swept off and carried near the secondary spark, thus further reducing wall-quenching.

3. The substance of claim 1, said ignition spark device comprising:

a U-shaped magnet around the wall of said cylinder with north and south poles extending through most of the inner circumference thereof and joined by a soft iron core apart from the cylinder;

a field coil wound around the soft iron core and receiving excitation energy from a battery means;

a divided coil made of two semi-circles of wires extending around most of the periphery of the piston, the ends of all wires in each semi-circle being joined to one of a pair of vertical connecting wires, there being a second pair for the other semi-circle;

circuit lines leading from the ends of the vertical wires;

connected to these circuit lines, a current reversing means to reverse the current produced in every alternate stroke of the piston, so that direct current in one direction will be produced at all times, whether the piston is going up or down;

wires connected to and leading from the current-reverser;

a capacitor connected to these wires;

wires leading from the capacitor;

a means for unloading the capacitor joined to these wires;;

circuit wires leading from this unloading means;

spark electrodes connected to these circuit wires;

all these components working together so that when the piston lowers the coil semi-circles the coil wires cut the magnetic lines of force downward, producing electric current in one direction which flows through the current-reversing means, which is wired to let it pass through with no reversal, thence on to the capacitor which it loads partially; as the piston goes upward the coil wires cut the magnetic lines of force upward, produce direct current in the opposite direction which flows to the current-reversing means where it is reversed, and continues thence to the capacitor which is further loaded till the piston nears the top of its stroke; at this time the capacitor-unloading means operates, sending all the current through circuit lines to the spark electrodes across which it leaps in a strong spark discharge.

4. The substance of claim 3, said capacitor-unloading means being a drum switch comprising:

a short cylindrical drum of durable non-conducting material, rotating in a limited arc around an imaginary axis and located between contacts connected to wires that lead to said capacitor on one side, and contacts that connect to wires leading to said spark electrodes on the other side;

two pairs of contact plates, one pair on each end of drum;

two wires running lengthwise through the drum and connecting the two pairs of contact plates so that current can flow through;

a heavy pie-shaped segment running from the axis to the periphery of the drum and cutting an arc therein;

all these components working together so that when the heavy segment is up, as during downward strokes of the piston, no contacts are made, no current flows through and the capacitor holds its charge, but when the piston moves upward the heavy segment moves down, contacts are made through the drum between the wires from the capacitor and the circuit wires to the spark electrodes, and current flows between the electrodes to produce a spark discharge.

5. The substance of claim 3, said capacitor unloading means being a narrow metal bridge inserted in the cylinder and selectively placed near the top thereof so that the ends of one wire leading from said capacitor and one wire leading to one of said spark electrodes will contact the bridge at the precise moment needed to close the circuit and let the current from the capacitor flow through and leap across the spark electrodes in a spark discharge.

6. The substance of claim 1, said means for causing heavier particles in the exhaust to fall out consisting of baffle plates that produce vortices and turbulence within the exhaust stream, and a sieve that filters out some particles;

said container means being a depositary in which the heavy particles are accumulated and held between emptyings.

7. The substance of claim 1, said container means for adsorbents comprising:

a double coil of pipe so arranged that one pipe is inside the other, an annular space separates the pipes, the pipes are made of material with numerous openings through which exhaust gases can flow, the coil winds around a central cylinder in which other burner-muffler components are housed, there are one or more annular divisions of the annular space, each such division is filled with adsorbents, adsorbents of heavy exhaust components that will be forced outward by centrifugal force are placed in an outer division, adsorbents of lighter components are placed in divisions near the inner part of the coil where they are more likely to be forced by the pressure of the heavy components on the outside, whereby when exhaust gases from the manifold pass through said heating element and the contents of said grid container, into the double coil, many heavy components will be flung through the outer divisions into the adsorbents there, lighter components will be forced inward and through the adsorbents there, and remaining exhaust components will flow from the end of the double coil into the chamber of said burner whence they will pass through filters toward the exhaust pipe; and a cooling chamber surrounding the double coil for the purpose of cooling it and thereby increasing the adsorbent efficiency which is low at high temperatures, the chamber being arranged so that it is supported on the wall of the cylinder and of said burner, it receives cool air at limited pressure from said compressor-container, the air flows over and around the double coil, cooling it, and the air, now heated by the double coil and by the gases that have passed into, through and out of said adsorbents, flows through a pipe leading into the exhaust pipe.

References Cited

UNITED STATES PATENTS

| | | | |
|---|---|---|---|
| 2,260,610 | 10/1941 | Dilucci | 123—149 |
| 2,756,735 | 7/1956 | Oehrli | 123—119 |
| 3,060,678 | 10/1962 | Ridgway | 60—30 |
| 3,209,735 | 10/1965 | Clarke | 123—193 |

MARK NEWMAN, *Primary Examiner.*

RALPH D. BLAKESLEE, *Examiner.*